United States Patent Office 3,287,142
Patented Nov. 22, 1966

3,287,142
PROTECTIVE COATING COMPOSITION
Paul Russell, Jr., Springfield, Pa., assignor to E. I. du Pont de Nemours and Company, Wilmington, Del., a corporation of Delaware
No Drawing. Filed July 22, 1963, Ser. No. 296,494
4 Claims. (Cl. 106—14)

This invention relates to a protective coating composition containing an alkali metal silicate vehicle pigmented with a metal dust and barium borate and more particularly to a cured coating of such a composition.

Protective coating compositions of an alkali metal silicate with powdered metals, such as zinc and lead, have been used to protect iron and steel structures. These coatings can be cured by exposure to high temperatures but the more desirable and practical method for large structures is to cure the coating chemically. U.S. Patent 2,952,562 describes curable coatings which can be used and also methods and materials for curing these coatings. However, some of the well known coatings have objectionable characteristics such as "white rusting" and apparently do not cure evenly and uniformly upon application of the chemical curing agent which causes the coating to blister, flake, and peel in the spots where the coating has not been completely penetrated by the curing agent. The faults in these coatings appear after relatively short periods of time following application, making scrapping, cleaning and repainting of the areas necessary. There is a definite need for a protective coating composition which has the advantages of the materials of the prior art but which is free from the aforementioned deficiencies.

This invention provides a new protective coating composition comprising an alkali metal silicate vehicle, a metal powder such as zinc or lead dust or mixtures of zinc and lead dust, and barium borate. This composition is applied to a metal substrate, allowed to dry, and is chemically cured. The resulting coating provides excellent corrosion resistance to metal substrates, particularly ferrous metal substrates, for extended periods of time, compared to the prior art material, without blistering, cracking, peeling, checking and with reduced "white rusting."

The vehicle used in the coating composition of this invention is a water soluble alkali metal silicate, water, and a buffering agent. The preferred alkali metal silicate is a water soluble sodium silicate with a sodium oxide/silicon dioxide ratio range of ½–¼ with the preferred ratio being ⅓:3. However, when the alkali content of the sodium silicate is increased, the drying time also increases, therefore, it is desirable to keep the silicate vehicle at the preferred ratio. Other alkali metal silicates such as potassium silicate can also be used in this invention, but the sodium silicate gives the better corrosion resistant coating. The most suitable sodium silicate/water ratio is about 50 parts by weight silicate to 50 parts by weight water but is operable in the range of 90–40 parts sodium silicate with the corresponding 10–60 parts water. The buffer should be able to maintain the vehicle at about pH 11, since this pH level keeps the formation of gases to a minimum when the metal dust is mixed into the vehicle and also reduces the rate at which the mixture separates and thereby stabilizes the composition for a longer period of time. The preferred buffer is a combination of chromic acid and sodium-phosphate in the ratio of about 2/1 and in quantity about 2 parts by weight of the vehicle. Other buffers can also be used such as sodium bicarbonate, boric acid and a combination of chromic acid and sodium borate.

The pigment for the coating is preferably a combination of zinc dust and barium metaborate in a ratio of 85/15 (zinc dust/barium metaborate); however, ratios in the range from about 75/25 to about 95/5 can also be used. Instead of zinc dust, it is possible to use lead powder or a combination of lead powder and zinc dust with the barium metaborate. Small amounts of red lead can also be used in combination with the barium metaborate and the zinc dust. Barium metaborate is the preferred borate pigment. Barium metaborate coated with sodium silicate to prevent caking and formation of large crystalline hydrates is found to be particularly useful in this invention because of its non-hygroscopic nature. Other barium borates such as barium orthoborate, barium tetraborate, and barium octaborate may also be used on an equivalent weight basis.

The silicate based vehicle and the pigment are usually combined at the time the coating composition is to be used since the mixture thickens rapidly and sets in a relatively short time. The mixture range in which the coating composition is operable is from 75–95 parts pigment with the corresponding 25–5 parts of the silicate vehicle. The preferred composition is 91 parts pigment to 9 parts vehicle.

Generally, as soon as the coating composition is mixed, it is applied to the substrate, which is to be protected by conventional means such as spraying, brushing, dipping, flow coating, and the like. The coating composition is most useful on equipment constructed of metal which is exposed to corrosive conditions such as the interior and exterior of storage tanks, above ground piping, furnace stacks, well heads, exterior hulls of ships, fuel and salt water ballast tanks of vessels, and pump housings. The applied coating in its dried film state is about 3–4 mils thick but is water soluble and therefore must be cured so that it will become hard and insoluble. These coatings can be cured by exposing the coated surface to high temperatures, 200–500° F., for several hours which is not practical for most applications and in such situations the coating can be cured by a chemical means. U.S. Patent 2,952,562 describes various chemical curing agents which can be used to cure coatings produced with the compositions of this invention.

The chemical curing agent is applied by conventional means to the coated substrate after the coating has dried. The curing agent is allowed to cure the coating for about 8 hours and then the excess agent is washed off with water if a topcoat of another paint is to be applied. However, the wash step is not necessary if a topcoating is not going to be used.

The curing agent is preferably a solution of an acid salt in an organic vehicle such as alcohol and contains enough water to hydrolyze the acid salt. The acid salt must be capable of yielding an acid radical which will react with the silicate coating to make it hard and insoluble. This reaction does occur with the conventional zinc silicate, zinc-lead silicate, or lead silicate coatings, but the reaction in many instances apparently only occurs at the surface of the coating leaving the subsurface unreacted which, in a short time, causes the coating to blister, flake, check and peel. The coating composition of this invention permits the coating to cure evenly throughout its thickness (i.e., from the metal substrate to which it is applied to the surface of the outer coating).

The curing agent which is particularly useful in this invention is a dibutylamine phosphate dissolved in isopropyl alcohol, and water. In place of the di-n-butyl amine which is used in the preferred curing solution to obtain dibutylamine phosphate, it is practical to use any amine which will react with phosphoric acid or its equivalent to produce an amine salt which is soluble in an organic solvent, which is miscible with water, and which will hydrolyze in solution.

Other acid salts may be substituted for the phosphoric acid salts such as magnesium chloride, ammonium phosphate, aluminum sulphate, and other acid salts of hydrochloric, nitric, sulphuric, and chromic acid which are soluble in an organic solvent and by hydrolysis liberate an acid radical which will react with the silicate coating to render it insoluble. However, in making a substitution, care must be taken to avoid salts which by hydrolysis will release acid radicals so rapidly and in such a concentration so as to cause curing of only the surface of the coating and do not completely cure the coating throughout.

The invention is further illustrated by the following examples:

EXAMPLE 1

The following vehicle compositions are formulated: (all parts are by weight unless otherwise indicated).

Vehicle formulation #1:                          Parts
    Sodium silicate _____  68.3
    Water _____  30.8
    Sodium bicarbonate _____   0.1
    Boric acid _____   0.3
    Sodium phosphate _____   0.4
    Potassium chromate _____   0.1
                                                 _____
                                                  100.0

Vehicle formulation #2:
    Sodium silicate _____  72.6
    Water _____  25.4
    Chromic acid _____   1.0
    Sodium borate _____   0.5
    Sodium phosphate _____   0.5
                                                 _____
                                                  100.0

Vehicle formulation #3:
    Sodium silicate _____  72.6
    Water _____  25.9
    Chromic acid _____   1.0
    Sodium phosphate _____   0.5
                                                 _____
                                                  100.0

To each of these vehicle formulations a pigment blend of zinc dust/barium metaborate in the ratio of 85/15 is added and the paint is thoroughly mixed. 91 parts of pigment are used to a corresponding 9 parts of vehicle. Each of these coating compositions is then sprayed onto a 4 x 12 inch steel test panel and the coating is dried about three hours under normal room atmospheric conditions with the resulting coating being about 3-4 mils thick. A curing agent of the following composition is then applied by spraying:

Isopropyl alcohol _____  56.7
Di-n-butyl amine _____  13.3
Phosphoric acid _____  26.0
Water _____   3.0
Iso-octyl-phenoxy-polyethoxy ethanol _____   1.0
                                                 _____
                                                  100.0

The sprayed panels are cured by allowing them to stand at normal room conditions about 8 hours and the excess curing agent is then washed from the surface with water.

In all of the coated samples, the films are firmly bonded to the substrate indicating adequate adhesion.

EXAMPLE 2

Vehicle Formulation #3 of Example 1 is blended with various pigments to form the following coating compositions:

|  | Coating I | Coating II | Coating III | Coating IV |
|---|---|---|---|---|
| Vehicle, fms | 97.5 | 97.5 | 97.5 | 97.5 |
| Zinc dust, gms | 230.0 | 230.0 | 230.0 | 230.0 |
| Red lead, gms | 40.5 | 27.0 | 13.5 | |
| Barium Metaborate, gms | | 13.5 | 27.0 | 40.5 |
|  | 368.0 | 368.0 | 368.0 | 368.0 |

Each of these coating compositions is then sprayed onto a 4 x 12 inch steel test panel and the coating is dried about three hours under normal room atmospheric conditions with the resulting coating being about 3-4 mils thick. The curing agent used in Example 1 is then sprayed onto the coated samples, the resulting compositions are cured as in Example 1 and the samples are then washed to remove the excess curing agent.

The coated samples are next subjected to a salt (sodium chloride) spray test as described in ASTM B117-62. Five panels of each group are exposed to the salt spray test and examined after 5, 7, 12 and 20 days. The test is briefly described as follows:

The coated panels are placed in a salt spray cabinet meeting ASTM designation B117-62; a 5% NaCl fog is used and the test temperature is maintained at 95° F. The panels are held in slots on a rack so that they slant 15° from the vertical and the order of placement of the panels on the racks is randomized daily.

The following table shows the results:

|  | Time | | | |
|---|---|---|---|---|
|  | 120 Hours | 168 Hours | 288 Hours | 480 Hours |
| Coating I | Scattered blisters (fair condition). | Scattered blisters (fair condition). | Many blistres (poor condition). | Failed. |
| Coating II | No blisters (excellent condition). | No blisters (excellent condition). | Scattered blisters (fair condition). | Many blisters (poor condition). |
| Coating III | ___do___ | ___do___ | No blisters (excellent condition). | No blisters (excellent condition). |
| Coating IV | ___do___ | ___do___ | ___do___ | Do. |

The above test results show that as the concentration of barium metaborate in the coating is increased, the coating provides increased corrosion resistance to steel plates.

I claim:

1. A protective coating composition consisting essentially of 25-5 parts by weight vehicle of aqueous sodium silicate and 75-95 parts by weight pigment of a finely divided zinc powder and barium metaborate, said pigment having a zinc/barium metaborate weight ratio of about 75/25 to 95/5, said sodium silicate solution consisting essentially of about 90-40 parts by weight sodium silicate and about 10-60 parts by weight water.

2. The coating composition of claim 1 containing 9 parts by weight sodium silicate vehicle and 91 parts by weight pigment of zinc dust/barium metaborate in a weight ratio of about 85/15, wherein the silicate vehicle has a pH of about 11, contains about 50 parts by weight sodium silicate and about 50 parts by weight water, and has a ratio of $Na_2O:SiO_2$ of ½–¼.

3. A coated metal substrate in which the coating comprises the cured composition of claim 1.

4. The product of claim 3 in which the substrate is a ferrous metal.

References Cited by the Examiner

UNITED STATES PATENTS

| | | | |
|---|---|---|---|
| 2,576,372 | 11/1951 | Toulmin et al. | 117—135.1 |
| 2,576,845 | 11/1951 | McDonald | 117—135.1 |
| 2,944,919 | 7/1960 | Morris et al. | 106—14 |
| 2,952,562 | 9/1960 | Morris et al. | 106—14 |
| 2,998,328 | 8/1961 | Munger et al. | 117—135.1 |
| 3,033,700 | 5/1962 | Buckman et al. | 106—306 |
| 3,183,111 | 5/1965 | Buckman et al. | 23—59 |

ALEXANDER H. BRODMERKEL, *Primary Examiner.*

ALFRED L. LEAVITT, *Examiner.*

L. HAYES, *Assistant Examiner.*